(12) United States Patent
Walenta et al.

(10) Patent No.: US 11,034,618 B1
(45) Date of Patent: Jun. 15, 2021

(54) LOW-BELITE CSA CEMENT FOR CONSTRUCTION-CHEMICAL APPLICATIONS

(71) Applicant: Calucem GmbH, Mannheim (DE)

(72) Inventors: Günther Walenta, Genas (FR); Ronny Kaden, Edingen-Neckarhausen (DE); Markus Schmid, Nuremberg (DE)

(73) Assignee: Calucem GmbH, Mannheim (DE)

( * ) Notice: Subject to any disclaimer, the term of this patent is extended or adjusted under 35 U.S.C. 154(b) by 0 days.

(21) Appl. No.: 17/047,245

(22) PCT Filed: Apr. 18, 2019

(86) PCT No.: PCT/EP2019/060201
§ 371 (c)(1),
(2) Date: Oct. 13, 2020

(87) PCT Pub. No.: WO2019/206824
PCT Pub. Date: Oct. 31, 2019

(30) Foreign Application Priority Data

Apr. 26, 2018 (DE) .......................... 10 2018 110 136

(51) Int. Cl.
| | |
|---|---|
| C04B 28/06 | (2006.01) |
| C04B 11/28 | (2006.01) |
| C04B 9/11 | (2006.01) |
| C04B 7/32 | (2006.01) |
| C04B 7/36 | (2006.01) |
| C04B 7/52 | (2006.01) |
| C04B 7/44 | (2006.01) |
| C04B 7/42 | (2006.01) |
| C04B 7/34 | (2006.01) |

(Continued)

(52) U.S. Cl.
CPC .............. *C04B 7/323* (2013.01); *C04B 7/424* (2013.01); *C04B 7/44* (2013.01); *C04B 7/52* (2013.01)

(58) Field of Classification Search
USPC .......................................... 106/638, 692, 693
See application file for complete search history.

(56) References Cited

U.S. PATENT DOCUMENTS

| | | | |
|---|---|---|---|
| 5,580,508 A * | 12/1996 | Kobayashi | ............ C04B 28/188 264/234 |
| 6,730,162 B1 * | 5/2004 | Li | ........................... C04B 28/14 106/695 |

(Continued)

FOREIGN PATENT DOCUMENTS

| | | |
|---|---|---|
| DE | 3711549 C2 | 9/1997 |
| EP | 2842922 A1 | 3/2015 |

(Continued)

OTHER PUBLICATIONS

Y. El Khessaimi et al., Solid-state synthesis of pure ye'elimite, Journal of the European Ceramic Society 38 (2018) 3401-3411.

(Continued)

*Primary Examiner* — James E McDonough
(74) *Attorney, Agent, or Firm* — Carter, DeLuca & Farrell LLP

(57) ABSTRACT

The invention relates to a calcium sulfoaluminate cement, whereby it contains at least 90% by weight % C4A3$ in crystalline or amorphous form or as a mixture of crystalline and has amorphous parts.

4 Claims, 1 Drawing Sheet

(51) Int. Cl.
*C04B 7/00* (2006.01)
*C04B 28/00* (2006.01)
*C04B 32/00* (2006.01)

(56) References Cited

U.S. PATENT DOCUMENTS

| | | | |
|---|---|---|---|
| 9,624,131 B1* | 4/2017 | Dubey | E01C 7/36 |
| 9,676,014 B2* | 6/2017 | Moudilou | B09C 1/08 |
| 2013/0233207 A1* | 9/2013 | Marchi | C04B 28/065 |
| | | | 106/693 |
| 2013/0284070 A1* | 10/2013 | Dubey | C04B 12/005 |
| | | | 106/695 |
| 2015/0132063 A1* | 5/2015 | Moudilou | C04B 40/0028 |
| | | | 405/128.75 |

FOREIGN PATENT DOCUMENTS

| | | | | |
|---|---|---|---|---|
| EP | 2842925 A1 * | 3/2015 | | C04B 28/065 |
| EP | 2850042 B1 | 3/2016 | | |
| FR | 2807424 A1 | 10/2001 | | |
| WO | 2013171418 A1 | 11/2013 | | |

OTHER PUBLICATIONS

International Search Report for Application No. PCT/EP2019/060201 dated Sep. 13, 2019.
Written Opinion for application No. PCT/EP2019/060201 dated Sep. 13, 2019 English translation.

\* cited by examiner

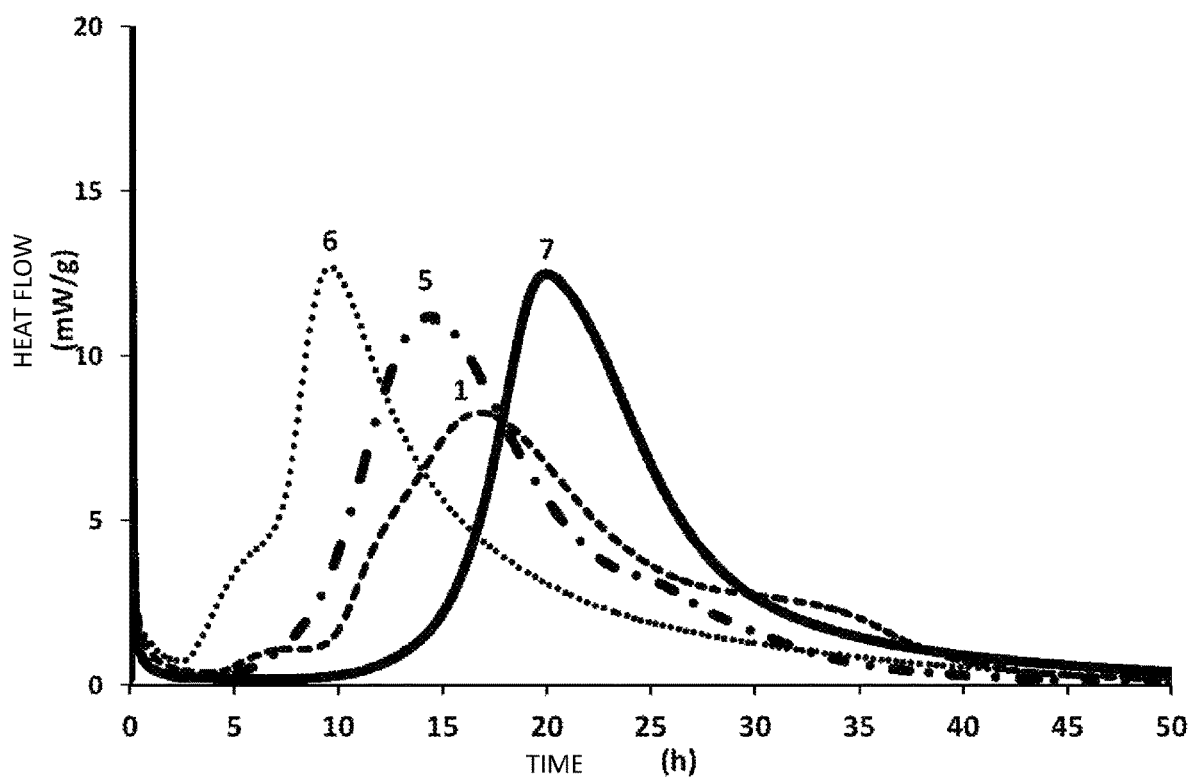

LOW-BELITE CSA CEMENT FOR CONSTRUCTION-CHEMICAL APPLICATIONS

The present invention relates to a CSA clinker and the manufacturing thereof, and cement pulverized therefrom and the use thereof.

The term CSA is used here as an abbreviation and stands for the chemical term calcium sulfoaluminate. In the narrower sense, calcium sulfoaluminate is understood to mean the chemical compound $C_4A_3\$$, the industrially manufactured variants of which are referred to as kleinite or Klein's Compound. The naturally occurring form is known as ye'elimite in mineralogy. The composition of the pure CSA phase and the formation thereof from the oxides corresponds to equation 1.

$$4C+3A+\$ \rightarrow C_4A_3\$$$  Equation 1

The equation is notated in cement-chemical shorthand. In the context of the present application the following notation is applicable: C: CaO; A: $Al_2O_3$; $: $SO_3$; F: $Fe_2O_3$; S: $SiO_2$; H: $H_2O$; T: $TiO_2$; M: MgO; Zn: ZnO, if necessary the exact chemical composition can be deduced from the context.

CSA cements have their application in different fields in the construction industry and construction chemistry, for example, as low-energy and low-$CO_2$ cements, as expanding cements and as high-early-strength and/or rapid-setting binders. First patented as quick-setting and seawater-resistant binders in 1934, the industrial application of CSA cements began in the late 1950s as expanding or expansive cements. Volume-stable CSA cements were then initially developed in the 1970s by the Chinese Building Materials Academy and today they are standardized in China as expanding cement, expansive cement, high-early-strength cement and low-alkali cement (Luigi Buzzi et. al. High-performance and low-$CO_2$ cements based on calcium sulfoaluminate, ZKG International Nr. 50, 2010, S. 39-45).

The starting materials and calcining temperatures in the manufacturing of CSA clinkers are generally selected in such a way that the cement contains, in addition to $C_4A_3\$$, the clinker phase $C_2S$ (belite), since the two phases require similar and comparatively much lower temperatures for their formation than Portland cement or aluminous cement clinkers. Since the calcining temperatures have a decisive influence on the necessary temperature for manufacturing, cements of this kind are therefore "low-energy cements" in comparison to Portland cement, of which the clinker is sintered at 1450° C. A further considerable advantage is a much lower CaO content of the CSA clinker and a correspondingly lower limestone content in the raw mixture, which leads to a substantial reduction in $CO_2$ emissions per t of produced clinker. CSA cements are therefore also referred to as "low-$CO_2$ cements."

Table 1 shows some comparison values for specific energy requirements and $CO_2$ emissions. These values are from: J. H. Sharp et. al. Calcium sulfoaluminate cements—low-energy cements, special cements or what, Advances in Cement Research, 1999, 11, No. 1, pp. 3-13.

TABLE 1

Specific energy requirements and $CO_2$ emissions of the pure phases

| Cement - phase (pure) | Enthalpy of formation [kJ/kg clinker] | $CO_2$ emissions [kg/kg clinker] |
|---|---|---|
| $C_3S$ | 1848 | 0.578 |
| β-$C_2S$ | 1336 | 0.511 |
| CA | 1030 | 0.278 |
| $C_4A_3\$$ | approx. 800 | 0.216 |

It is clear from Table 1 that cements based on $C_4A_3\$$ and $C_2S$ can be manufactured with considerably less thermal energy expenditure and lower $CO_2$ emissions than Portland cements in which the phases $C_3S$ ($3CaO.SiO_2$, tricalcium silicate, "alite") and $C_2S$ ($2CaO.SiO_2$, dicalcium silicate, "belite") form the mineralogical main components of the clinkers. The Portland cement clinkers manufactured in Germany have average contents of approx. 63 wt. % $C_3S$ and 16 wt. % $C_2S$ (VDZ Zement-Taschenbuch, 51$^{st}$ Edition, Table I.3.1-2). The phase CA ($CaO.Al_2O_3$, monocalcium aluminate) is the mineralogical main component of aluminous cements or calcium aluminate cements, in short CAC or CA cements according to DIN EN 14647. The content of monocalcium aluminate in standard aluminous cements is at least 40 wt. % (Friedrich W. Locher, Zement, Verlag Bau+Technik, 2000). Calcining $C_4A_3\$$ and $C_3S$ (alite), which is much more reactive in comparison with $C_2S$, together is practically impossible since the formation of alite requires temperatures >1350° C., under which temperatures the anhydrite part ($CaSO_4$) of the CSA raw mixture and also the formed $C_4A_3\$$ are no longer stable.

In literature regarding the manufacturing of CSA clinkers, the temperature range for maximizing the formation of both $C_4A_3\$$ and $C_2S$ (belite) is mainly indicated between 1250-1350° C. In some cases, the low reactivity of $C_2S$ is accepted and, in other cases, different methods and additives to the raw mixture are used in order to try to activate it. Since $C_4A_3\$$ is unstable even at temperatures of around 1330-1350° C. (anhydrite decomposes at temperatures >1200° C.), there are high demands in terms of composition and preparation of the raw materials, process control and measures for air pollution control in the manufacturing of CSA clinkers (Ivan Odler, Special Inorganic Cements, 2000; Luigi Buzzi et. al., ibid.).

The possibility of being able to use CSA cements as both expanding or expansive cements and also as dimensionally stable special cements having controllable setting and hardening properties can be explained by some basic hydration reactions of the phase $C_4A_3\$$. In Table 2, these reactions are shown for the pure $C_4A_3\$$ and for mixtures of $C_4A_3\$$ and calcium sulfate and calcium oxide/calcium hydroxide, along and in combination.

TABLE 2

Hydration reactions of C4A3$

| No. | Starting materials | | | Products | Setting[1] | Expansive[2] |
|---|---|---|---|---|---|---|
| 1 | $C_4A_3\$$ | + | 18H | → $C_4A\$H_{12}$ +2$AH_3$ | long | |
| 2.1 | 2$C_4A_3\$$ + 2C$ | + | 56H | → $C_6A\$_3H_{32}$ + 4$AH_3$ + $C_4A\$H_{12}$ | short | – |
| 2.2 | $C_4A_3\$$ + 2C$ | + | 38H | → $C_6A\$_3H_{32}$ + 2$AH_3$ | long | – |
| 3 | $C_4A_3\$$ + 7CH | + | 24H | → $C_3AH_6$ + 2($C_3A \cdot 0.5C\$ \cdot 0.5CH \cdot 12H$) | very short | |
| 4 | $C_4A_3\$$ + 8C$ + 6C | + | 96H | → 3$C_6A\$_3H_{32}$ | very short | + |

[1]US 2003/0183131 A1; [2]Buzzi et al., ibid.

It is known from US 2003/0183131 A1 that a lime made of $C_4A_3\$$ and water (Table 2, no. 1) has a very slow setting and hardening characteristic. The hydration products are monosulfate $C_4A\$H_{12}$ and aluminum hydroxide $AH_3$. If increasing amounts of calcium sulfate (anhydrite, dihydrate, etc.) are added, strengthening ettringite $C_6A\$_3H_{32}$ (Table 2, no. 2.1) is increasingly formed in addition to monosulfate and aluminum hydroxide, until, in a molar ratio $C\$:C_4A_3\$=2:1$, monosulfate no longer occurs and only ettringite and aluminum hydroxide are present (Table 2, no. 2.2). In a further increasing molar ration $C\$: C_4A_3\$=>2$, the hydration products are increasingly expansive. A method for manufacturing a calcium silicate object is known from DE 37 11 549 C2. Furthermore, the use of the calcium silicate object in different fields of application, inter alia as a construction material, is disclosed. A procedure for the synthesis of a pure C4A3$ phase and the characterization thereof is known from the scientific article "Solid-state synthesis of pure ye'elimite", Y. El Khessaimi et al., Journal of the European Ceramic Society, 30 (2018) 3401-3411.

The hydration of mixtures from $C_4A_3\$$ and calcium hydroxide or calcium oxide leads to hydrogranate $C_3AH_6$ and AFm phases. Table 2, no. 3 shows a reaction example with calcium hydroxide.

By adding calcium sulfate and calcium oxide (or calcium hydroxide) together, a rapidly setting and hardening mixture which exclusively forms ettringite can be manufactured corresponding to Table 2, no. 4.

The different types of sulfobelite cement which are still technically manufactured today and may contain further phases in different amounts in addition to $C_4A_3\$$ and belite can be divided into 5 categories. These categories which substantially characterize the system of belite-sulfoaluminate-ferrite cements (Ivan Odler, ibid.) are shown in Table 3.

TABLE 3

Characterization of commercially available CSA cements

| Abbreviation | Cement name | Characterization |
|---|---|---|
| SAB | sulfoaluminate belite | main component belite, CSA content rel. low |
| SFAB | sulfoferroaluminate belite | SAB, Al partly replaced by Fe |
| BSA | belite sulfoaluminate | Main component CSA, belite part lower |
| BSFA | belite sulfoferroaluminate | BSA, Al partly replaced by Fe |
| BSAF | belite sulfoaluminate ferrite | SAFB, higher Fe part in the CSA, clear ferrite content |

The prior art makes available a wide range of CSA cements which contain $C_4A_3\$$ components and belite as a further essential main component. US 2013/233207 discloses a method for manufacturing calcium sulfoaluminate cement, a mixture of raw materials being used which contains between 10 and 35 wt. % $Al_2O_3$, between 40 and 50 wt. % CaO and between 5 and 25 wt. % SO3 and between 0 and 28 wt. % $SiO_2$ and between 0 and 30 wt. % Fe2 03, wherein the mixture is calcined at a calcining temperature of at least 1200-1300° C.

Commercially available CSA cements are generally designed as SAB/SAFB to BSA/BSFA variants, corresponding to Table 3. By using raw materials which contain silicate, different belite contents are possible that ensure a slow long-term post-hardening and are used to limit the maximum amount of ettringite to be formed. The two aspects are useful when using CSA cements as binders in mortars and concretes and absolutely necessary with respect to durability and volume stability of the hardened cement.

Unhydrated residues of ettringite-forming components remaining in the hardened cement can lead to secondary ettringite formation in the event of later moisture or water ingress, e.g. in porous systems or as a result of micro-cracks, and therefore to damage of the shaped part or component or even to the complete destruction thereof.

This problem becomes clear when the crystallization water content of pure ettringite $C_6A\$_3H_{32}$ is considered which is 45.9 wt. % and therefore corresponds to a water/cement or a water/solids value of 0.85. In mortar recipes where this water/cement value usually stays substantially below this water/cement value, the content of ettringite-forming components in the binder, e.g. by a content of belite, must be limited accordingly in order to ensure the complete hydration thereof.

In multi-component construction-chemical recipes which, in addition to CSA cement, can also contain Portland cement and adjusted calcium sulfate content, it is desirable to have a binder that has the highest possible content of hydraulically active, ettringite-forming phase and does not contain limiting, hydraulically low or inactive components.

The object of the present invention is that of providing a CSA cement of this kind having a high content of active phase $C_4A_3\$$ and small parts of hydraulically low or unreactive phases, in particular for use in construction chemistry. The calcium sulfoaluminate cement according to the invention has only small parts of low or unreactive phases and can therefore be used in construction-chemical recipes in low amounts as a CSAB cement which contains substantial parts of low to unreactive belite. This advantage has a positive effect in several respects, an example of which is the reduction in the storage volume required.

The CSA cement according to the invention has only low contents of different hydraulically highly reactive phases, such as calcium aluminate ($C_{12}A_2$, $C_3A$, CA) or also CaO and/or $Ca(OH)_2$, which could interfere with the $C_4A_3\$$ hydration in certain circumstances. Therefore, the component achieves a high level of uniformity and a high level of efficiency, which is of particular interest in construction chemistry.

It is also clear from Table 1 that the CSA cement according to the invention has considerable advantages from a cost and environmental point of view both with respect to its specific energy requirement in kJ/kg and with respect to the specific $CO_2$ emissions in kg/kg of the produced clinker in comparison with higher belite-containing CSA cements. The specific energy requirement for producing $C_4A_3\$$ is approximately 40% lower and the specific $CO_2$ emissions are more than 50% lower than when producing belite.

In addition to construction-chemical recipes and the use of the CSA cement according to the invention as binder components in recipes of the construction-chemical industry, the invention also relates to further fields of use for CSA cements in which adding highly effective component $C_4A_3\$$ is advantageous, such as shrinkage compensated systems or immobilizing pollutants and heavy metals or coatings and paints.

The calcium sulfoaluminate according to the invention contains at least 90 wt. % C4A3$ in crystalline or amorphous form or as a mixture of crystalline and amorphous parts, the calcium sulfoaluminate having a specific grinding fineness according to Blaine from 3500 $cm^2/g$, preferably from 4000 $cm^2/g$, more preferably from 4500 $cm^2/g$, to 6250 $cm^2/g$, preferably to 6000 $cm^2/g$, more preferably to 5750 $cm^2/g$, even more preferably to 5500 $cm^2/g$. The calcium aluminate cement according to the invention further has at most 0.5 wt. % free lime, calculated as CaO, and/or at most 0.5 wt. % $C_3A$, and/or at most 2.0 wt. % mayenite, calculated as $C_{12}A_2$, and/or at most 10.0 wt. % krotite, calculated as CA, and further between 0.5 and 10 wt. % $C_4AF$ and its mixed crystals $C_6A_{3-x}F_x$ with $1 \leq x \leq 3$ and/or between 0.5 and 10 wt. % belite, calculated as $C_2S$, and/or at least 0.5 wt. % krotite, calculated as CA. As a result, the calcium sulfoaluminate cement has advantageous processing and strength properties.

Advantageously, the calcium sulfoaluminate cement according to the invention contains at most 99.5 wt. %, preferably at most 99 wt. %, more preferably at most 98 wt. %, even more preferably at most 97 wt. %, particularly preferably at most 96 wt. %, even more particularly preferably 95 wt. % $C_4A_3\$$. As a result, manufacturing is simplified while still having advantageous processing and strength properties.

Advantageously, the calcium sulfoaluminate cement according to the invention contains at most 0.2 wt. %, preferably at most 0.1 wt. %, free lime, calculated as CaO.

Advantageously, the calcium sulfoaluminate cement according to the invention contains at most 0.2 wt. %, preferably at most 0.1 wt. %, $C_3A$.

Advantageously, the calcium sulfoaluminate cement according to the invention contains at most 1.0 wt. %, preferably at most 0.5 wt. %, mayenite, calculated as $C_{12}A_7$.

Advantageously, the calcium sulfoaluminate cement according to the invention contains at most 7.5 wt. %, preferably at most 5.0 wt. %, more preferably at most 2.5 wt. %, even more preferably at most 1.0 wt. %, krotite, calculated as CA.

Advantageously, the calcium sulfoaluminate cement according to the invention contains at most 7.5 wt. %, preferably at most 5.0 wt. %, more preferably at most 2.5 wt. %, even more preferably at most 1.0 wt. %, $C_4AF$ and its mixed crystals $C_6A_{3-x}F_x$ with $1 \leq x \leq 3$.

Advantageously, the calcium sulfoaluminate cement according to the invention contains at most 7.5 wt. %, preferably at most 5.0 wt. %, more preferably at most 2.5 wt. %, even more preferably at most 1.0 wt. %, belite, calculated as $C_2S$.

Advantageously, the calcium sulfoaluminate cement according to the invention contains at least 1 wt. %, preferably at least 1.5 wt. %, more preferably at least 2 wt. %, even more preferably at least 2.5 wt. %, krotite, calculated as CA.

Advantageously, the calcium sulfoaluminate cement according to the invention contains at least 1 wt. %, preferably at least 1.5 wt. %, more preferably at least 2 wt. %, even more preferably at least 2.5 wt. %, $C_4AF$ and its mixed crystals $C_6A_{3-x}F_x$ with $1 \leq x \leq 3$.

Advantageously, the calcium sulfoaluminate cement according to the invention contains at least 1 wt. %, preferably at least 1.5 wt. %, more preferably at least 2 wt. %, even more preferably at least 2.5 wt. %, belite, calculated as $C_2S$.

Advantageously, the calcium sulfoaluminate cement according to the invention contains one or more of the following further elements: Si, Na, K, Mg, Sr, Ba, Ti. Zr, V, P, Cr, Mn and Zn. The elements can be contained in pure form and/or in the form of their oxide in different oxidization stages and/or in the form of different compounds. Additionally or alternatively, transition metals in pure form and/or in the form of their oxide in different oxidization stages and/or in the form of different compounds can also be contained.

In addition to the crystalline form, the mineral phases can also be present partly in cryptocrystalline form and amorphous form, or as mixtures of crystalline, cryptocrystalline and/or amorphous forms in the calcium sulfoaluminate cement according to the invention. When specifying phase contents in wt. %, the amorphous parts thereof of the same chemical composition are also included.

It is known that, within the crystal lattice of calcium aluminate (CA, $CA_2$, $C_3A$, $C_{12}A_7$) and calcium sulfoaluminate ($C_4A_3\$$), $Al^{3+}$ can be replaced by $Fe^{3+}$. Such mixed crystal formations of $Fe^{3+}/Al^{3+}$ are expressly included in the naming of mineral phases; however, they not explicitly indicated in the formal representation of the components.

An independent invention is the use of the presently described calcium sulfoaluminate cement according to the invention as a binder component in recipes of the construction-chemical industry.

A further independent invention is a method for manufacturing of a calcium sulfoaluminate cement having at least 90 wt. % $C_4A_3\$$ in crystalline or amorphous form or as a mixture of crystalline and amorphous parts and a specific grinding fineness according to Blaine between 3500 $cm^2/g$ and 6250 $cm^2/g$, wherein, for manufacturing the calcium sulfoaluminate cement, a mixture of raw materials is used which contains between 41 and 50 wt. %, preferably between 42.5 and 50 wt. %, $Al_2O_3$ and between 34 and 41 wt. %, preferably between 35 and 40 wt. %, CaO and between 11 and 19 wt. %, preferably between 12 and 18 wt. %, $SO_3$, and between 0.1 and 3 wt. % $SiO_2$ and/or between 0.1 and 1 wt. % $Fe_2O_3$ and/or between 0.05 and 2.5 wt. % $TiO_2$ and/or between 0.05 and 2.5 wt. % ZnO, the method further comprising the steps of: calcining the mixture of raw materials at a calcining temperature of at least 1150° C. and pulverizing the raw materials to a mixture of raw materials with a specific grinding fineness according to Blaine between 3500 $cm^2/g$ and 6000 $cm^2/g$.

Preferably, using this method, the mixture of raw materials contains 0.1 and 2.5 wt. % $SiO_2$ and/or between 0.1 and 0.7 wt. % $Fe_2O_3$ and/or between 0.05 and 2.1 wt. % $TiO_2$ and/or between 0.05 and 2.4 wt. % ZnO.

Preferably the method comprises the steps of: calcining the mixture of raw materials at a calcining temperature of at least 1175° C., preferably of at least 1200° C., more preferably of at least 1225° C., and at most 1350° C., preferably of at least 1325° C., more preferably of at least 1300° C.; and/or pulverizing the raw materials to a mixture of raw materials with a specific grinding fineness according to Blaine of 4000 $cm^2/g$, preferably of 4500 $cm^2/g$, to 5500 $cm^2/g$, wherein the pulverizing is performed in a ball mill, preferably in two step, wherein in both steps different grinding bodies are used in the ball mill.

EXAMPLE 1

By using the starting materials: calc. bauxite, limestone, calcium sulfate and calc. alumina, 7 homogenous mixtures with a specific grinding fineness according to Blaine of approx. 5000 $cm^2/g$ have been produced. Each chemical composition of the starting materials is specified in Table 4.

The mixture 7 additionally contains the powdery pure substance component ZnO as a mineralizer. Each of the amounts of starting materials for manufacturing the 7 mixtures are given in Table 5. Each chemical composition of the 7 mixtures is given in Table 6.

TABLE 4

Chemical characterization of starting substances

| Raw material | Calc. bauxite | Limestone | Calcium sulfate | Calc. alumina |
|---|---|---|---|---|
| LOI | 0.21 | 43.72 | 10.85 | 0.14 |
| $SiO_2$ | 5.13 | 0.19 | 0.27 | 0.02 |
| $Al_2O_3$ | 88.52 | 0.04 | 0.35 | 99.86 |
| $TiO_2$ | 4.45 | 0.01 | 0.01 | 0 |
| MnO | 0.01 | 0.01 | 0.01 | 0.01 |
| $Fe_2O_3$ | 1.12 | 0.04 | 0.07 | 0.03 |
| CaO | 0 | 55.77 | 40.49 | 0 |
| MgO | 0.29 | 0.43 | 0.11 | 0.03 |
| $K_2O$ | 0.54 | 0.03 | 0.03 | 0.01 |
| $Na_2O$ | 0.01 | 0 | 0 | 0.1 |
| $SO_3$ | 0.03 | 0.05 | 47.79 | 0.03 |
| Total | 100.31 | 100.29 | 99.98 | 100.23 | all data in wt. %

TABLE 5

Composition of 7 raw mixtures

| Mixture | 1 | 2 | 3 | 4 | 5 | 6 | 7 |
|---|---|---|---|---|---|---|---|
| Calc. bauxite | — | 30.4 | 39.2 | 20.5 | — | — | — |
| Limestone | 34.4 | 38.6 | 40.2 | 36.9 | 33.3 | 33.3 | 34.4 |
| Calcium sulfate | 24.6 | 21.5 | 20.6 | 22.1 | 26.7 | 30.0 | 24.0 |
| Calc. alumina | 41.0 | 9.5 | — | 20.5 | 40.0 | 36.7 | 40.0 |
| ZnO | — | — | — | — | — | — | 1.6 | all data in wt. %

TABLE 6

Chemical analysis (free of loss on ignition) of the raw mixtures according to Table 5

| Mixture | 1 | 2 | 3 | 4 | 5 | 6 | 7 |
|---|---|---|---|---|---|---|---|
| $SiO_2$ | 0.2 | 1.9 | 2.5 | 1.3 | 0.2 | 0.2 | 0.1 |
| $Al_2O_3$ | 49.9 | 44.4 | 42.5 | 46.4 | 47.5 | 45 | 47.2 |
| $TiO_2$ | 0.0 | 1.6 | 2.1 | 1.1 | 0.0 | 0.0 | 0.0 |
| $Fe_2O_3$ | 0.1 | 0.5 | 0.6 | 0.4 | 0.1 | 0.1 | 0.1 |
| CaO | 35.5 | 38.3 | 39.5 | 37.2 | 36.3 | 37.1 | 35.7 |
| $SO_3$ | 13.9 | 12.9 | 12.5 | 13.0 | 15.6 | 17.4 | 13.8 |
| ZnO | — | — | — | — | — | — | 2.31 |
| Total | 99.6 | 99.6 | 99.7 | 99.4 | 99.7 | 99.8 | 99.21 | all data in wt. %

Pellets were pressed from partial amounts of each of the 7 mixtures and each was calcined for 1 hour at 1250° C. Then they were removed from the kiln, cooled down to room temperature and ground back to the starting fineness. These materials were analyzed by quantitative XRD analysis using the Rietveld method and then the entire sample was calcined again for one hour at the same temperature. After being cooled down and ground down again, this sample was analyzed again by XRD analysis. The results of these analyses are shown in the following Table 7.

TABLE 7

Mineralogical analyses of mixtures 1-7 (calcining at 1250° C.)

| Mixture | 1 | 2 | 3 | 4 | 5 | 6 | 7 |
|---|---|---|---|---|---|---|---|
| Ye'elimite ($C_4A_3\$$) | 94.3 | 93.7 | 91.3 | 95.3 | 91.0 | 92.3 | 98.5 |
| Anhydrite (C$) | 0.8 | — | — | 0.4 | 3.7 | 6.8 | — |
| Perovskite (CT) | — | 3.1 | 3.2 | 1.6 | — | — | — |
| Krotite (CA) | 4.4 | — | — | — | 3.9 | — | 0.4 |
| Mayenite ($C_{12}A_7$) | 0.4 | — | 0.5 | — | 1.3 | — | — |
| Free lime (CaO) | — | 0.1 | — | — | — | 0.8 | — |
| Belite ($C_2S_{\alpha,\beta}$) | 0.1 | 3.1 | 5.0 | 2.3 | 0.1 | 0.1 | — |
| Gehlenite ($C_2AS$) | — | — | — | 0.4 | — | — | — |
| Gahnite ($ZnAl_2O_4$) | — | — | — | — | — | — | 1.1 | all data in wt. %

Table 7 shows that the targeted ye'elimite content of >90 wt. % is present in all 7 mixtures under the mentioned conditions with the raw materials used.

Samples 1, 5, 6 and 7 were selected from the seven clinkers obtained in this way. Each were ground for 2 minutes in a vibrating disk mill with agate insert at 700 rpm without additives to a fineness of 5000 cm²/g+/−250 cm²/g according to Blaine and then hydrated in a heat flow calorimeter at 20° C. with a water/cement of 0.50 for 50 h. The measured heat flow curves are shown in FIG. 1.

FIG. 1 shows a comparison of the heat flow curves of mixtures 1, 5, 6 and 7. All the mixtures examined in the calorimeter have a long dormant period of at least 2.5 h after being mixed and show a pronounced heat flow maximum. In comparison to the heat flow curves of mixtures 1, 5 and 6, mixture 7 shows a clearly longer open time in the cement paste of approx. 7.5 h. At the same time, mixture 7 has a homogenous hydration reaction.

EXAMPLE 2

For a calcining test on the semi-industrial scale, the raw mixture was selected according to the chemical composition of mixture 7 in Table 6 and manufactured from new raw materials under the designation "R-BC7." The chemical compositions of these raw materials are shown in Table 8. The percentage composition of raw mixture R-BC7 is shown in Table 9.

TABLE 8

Chemical characterization of the raw materials for mixture R-BC7.

| Raw material | Anhydrite | Calc. alumina | Limestone | Lime hydrate |
|---|---|---|---|---|
| LOI | 3.37 | 0.71 | 43.57 | 24.29 |
| $SiO_2$ | 0.74 | 0.01 | 0.26 | 1.94 |
| $Al_2O_3$ | 0.05 | 99.03 | 0.09 | 0.57 |
| $Fe_2O_3$ | 0.05 | 0.01 | 0.01 | 0.25 |
| CaO | 40.30 | 0.03 | 55.32 | 71.51 |
| MgO | 0.74 | 0.06 | 0.68 | 0.96 |
| $SO_3$ | 54.29 | 0.00 | 0.00 | 0.25 |
| $K_2O$ | 0.02 | 0.00 | 0.00 | 0.10 |
| $Na_2O$ | 0.06 | 0.16 | 0.03 | 0.04 |
| $P_2O_5$ | 0.02 | 0.00 | 0.02 | 0.01 |
| $TiO_2$ | 0.00 | 0.00 | 0.00 | 0.02 |
| $Mn_2O_3$ | 0.01 | 0.00 | 0.00 | 0.02 |
| SrO | 0.33 | 0.00 | 0.03 | 0.04 |
| ZnO | 0.01 | 0.01 | 0.00 | 0.01 |
| Total | 99.99 | 100.02 | 100.01 | 100.01 | all data in wt. %

TABLE 9

Percentage composition of raw mixture R-BC7

| Calc. alumina | 39.7 |
|---|---|
| Limestone | 27.8 |

TABLE 9-continued

Percentage composition of raw mixture R-BC7

| | |
|---|---|
| Lime hydrate | 9.5 |
| Anhydrite | 21.0 |
| ZnO | 2.0 | all data in wt. %

Using a granulating plate, granules of raw mixture R-BC7 having an average diameter of 10 mm. The lime hydrate part used as a raw mixture component was used to improve the ability to granulate.

The granules were placed in a heavy oil-fired test rotary kiln that was 7 m long and had an inner diameter of 50 cm. The kiln was run at 1.5 rpm. The calcining temperature in the sinter zone was maintained at an average of 1270° C. The dwell time of the material to be calcined in the sinter zone was 30-40 minutes.

After being cooled, the clinker K-BC7 according to the invention was ground in two stages. It was first ground in a ball mill with a ball filling and it was ground for a second time in a ball mill having cylindrical grinding bodies. The clinker was pulverized without further additives. The target fineness was 5000 cm$^2$/g according to Blaine. In total, more than 100 kg of the CSA cement according to the invention with the designation BC7 were produced from the clinker K-BC7 according to the invention.

Table 10 shows the chemical analysis of the CSA cement according to the invention with the designation BC7 from the grinding of clinker K-BC7. The chemical analyses of random samples of the two commercially available CSA cements "Alipre" (Italcementi) and "Next Base" (Buzzi Unicem) are shown as comparison data.

TABLE 10

Chemical analyses of the CSA cement BC7 according to the invention and of two commercially available comparison products.

| Cement | Test parameters | "Alipre" (Italcementi) | "Next Base" (Buzzi Unicem) | "BC7" (Calucem) |
|---|---|---|---|---|
| Chemical composition (wt. %) | LOI | 0.52 | 1.43 | 0.06 |
| | SiO$_2$ | 8.83 | 10.52 | 0.59 |
| | Al$_2$O$_3$ | 31.23 | 29.43 | 47.20 |
| | TiO$_2$ | 0.43 | 1.49 | 0.02 |
| | MnO | 0.17 | 0.04 | 0.00 |
| | Fe$_2$O$_3$ | 1.50 | 3.00 | 0.05 |
| | CaO | 40.18 | 41.68 | 36.90 |
| | MgO | 4.28 | 2.51 | 0.49 |
| | K$_2$O | 0.50 | 0.39 | 0.01 |
| | Na$_2$O | 0.81 | 0.37 | 0.00 |
| | SO$_3$ | 11.37 | 9.24 | 12.90 |
| | P$_2$O$_5$ | 0.12 | 0.00 | 0.01 |
| | ZnO | 0.00 | 0.00 | 1.90 |
| | Total | 99.94 | 100.10 | 100.12 |
| Residues (wt. %) | 90 μm | 0.0 | 1.4 | 4.2 |
| Fineness | Blaine (cm$^2$/g) | 4700 | 4600 | 5210 |

The mineralogical composition of the CSA cement BC7 according to the invention is shown in Table 11. These values are compared with random sample analyses of the commercially available calcium sulfoaluminate cements "Alipre" (Italcementi) and "Next Base" ((Buzzi Unicem).

The two CSA cements "Alipre" and "Next Base" have a C$_4$A$_3$$ content of less than 90 wt. % and a belite (C$_2$S$_{\alpha,\beta}$) content of 11.80 wt. % ("Alipre") or 17.70 wt. % ("Next Base").

The CSA BC7 according to the invention has a C$_4$A$_3$$ content of 94.5 wt. % and a belite (C$_2$S$_{\alpha,\beta}$) content of 2.0 wt. %. Rapidly setting phases, such as C$_{12}$A$_7$, are not present or only in traces.

All phase contents were determined using the Rietveld software, HighScore Plus, Version 4.6a from PANalytical B. V., Almelo, The Netherlands. A PANalytical Cubix Röntgen Diffractometer with rapid Xcelerator Detector was used for analysis.

TABLE 11

Mineralogical analyses of the CSA cement BC7 according to the invention and of two commercially available CSA cements

| CSA cement | "Alipre" (Italcementi) | "Next Base" (Buzzi Unicem) | CSA BC7 according to the invention (Calucem) |
|---|---|---|---|
| C$_4$A$_3$$ | 69.2 | 61.9 | 94.5 |
| α-C$_2$S | 4.2 | 11.3 | 0.8 |
| β-C$_2$S | 7.6 | 6.4 | 1.2 |
| C$ | 0.7 | 4.4 | 1.0 |
| C$_3$MS$_2$ | 2.1 | 5.3 | — |
| C$_2$AS | 2.3 | 4 | — |
| 3C$_2$S$_3$•C$•CaF$_2$ (ellastadite-fluorine) | 5.3 | — | — |
| CT | 0 | 3.9 | — |
| C$_3$FT | 3.7 | 1.1 | — |
| MgO | 4.1 | 1.7 | — |
| CA | — | — | 1.1 |
| C$_{12}$A$_7$ | 0.8 | 0 | 0.3 |
| ZnA (gahnite) | — | — | 1.1 | all data in wt. %

The water demand to achieve the standard stiffness, setting time on the lime and compressive strength development on the standard mortar after 24 hours were determined in accordance with EN 14647 for the cement BC7 according to the invention and the comparison samples "Alipre" and "Next Base."

In accordance with EN 14647, the test method of EN 196-3 is used to determine the standard stiffness and the water demand required therefor. The compressive strength is determined in accordance with EN 14647 on a standard mortar which, at a standard sand content of 1350 g, contains 500 g cement and 200 g water (water/cement=0.40). The results of the tests of the water demand and the setting behavior on lime and the compressive strength tests are shown in Table 12.

TABLE 12

Results of the setting test and the strength test.

| Test parameters | | "Alipre" (Italcementi) | "Next Base" (Buzzi Unicem) | CSA BC7 according to the invention (Calucem) |
|---|---|---|---|---|
| Setting lime | Water requirement (%) | 32.0 | 32.0 | 28.0 |
| | SB (h:min) | 0:09 | 0:17 | 1:45 |
| | SE (h:min) | 0:12 | 0:20 | 2:30 |
| Compressive strength | 24 h (MPa) | 25 | 6 | 44 |

SB = Setting begins; SE = Setting ends

The commercially available comparison cements both demonstrate a quick setting on the cement lime of 9 minutes ("Alipre") or 17 minutes ("Next Base"), with a water demand of 32%.

In contrast, the calcium sulfoaluminate cement BC7 according to the invention has a significantly longer setting characteristic in the lime with a lower water requirement of 28%. The values for the water requirement and the setting characteristic in the lime can be comparable with the values of Portland and aluminous cements. The "Alipre" comparison cement shows the shortest processing time with the setting beginning at 9 minutes.

After 24 h the compressive strength of the "Next Base" is at 6 MPa and that of the "Alipre" is at 25 MPa. However, the calcium sulfoaluminate cement BC7 according to the invention already has a compressive strength of 44 MPa after 24 h and therefore has a strength which is almost double the strength of the commercially available comparison sample "Alipre."

EXAMPLE 3

Using the CSA cement BC7 according to the invention, various construction-chemical mixtures were manufactured as self-levelling filler, using industry-standard binder components, additives and filing agents which are typical for products in the field of tile adhesives, levelling compounds, fillers and repair mortars.

Self-levelling fillers are particularly demanding products among the construction-chemical recipes. It should have a good to very good progression over the processing time of 30 min and it must ensure high early strength and rapid accessibility. Generally, high-quality self-levelling fillers have a high content of calcium sulfoaluminate cement.

The compositions of the different recipes are given in Table 13. The recipe components are divided into "binder," "additive I and II" and "filling agent." Each of the basic recipes was made with the calcium sulfoaluminate cement BC7 according to the invention. The two recipes with the CSA cement BC7-1 and BC7-2 according to the invention are compared with recipes with the commercially available comparison cements "Alipre" (Italcementi) and "Next Base" (Buzzi Unicem). Recipe BC7-1 contains 19.66 wt. % of the CSA cement BC7 according to the invention. The BC7 content was reduced to 14.74 wt. % in recipe BC7-2 and the recipe was made up to 100% with ground limestone (F2).

The four mixtures were tested over a period of time of 30 minutes after their manufacturing by measuring slump a5, a15 and a30 for their consistency, and on standard prisms 4 cm×4 cm×16 cm for their compressive strength development after 4 h, 6 h and 24 h. The terms and abbreviations used in Table 13 are explained in the following.

"Binder" is understood to mean the recipe parts: Portland cement (OPC) Milke Premium CEM|52.5 R, HeidelbergCement AG; calcium sulfoaluminate cement (CSA) and calcium sulfate (C$) anhydrite—Micro A, Casea.

"Additive I" refers to the additives having a primarily retarding and accelerating effect: tartaric acid L(+) p.a. (WS), HARKE Chemicals GmbH; and lithium carbonate pure. (LiC), Merck, item no. 5670.

"Additive II" comprises additives which exert primary influence on the consistency of the mixture: liquefied ViscoCrete-225 P (VF), SIKA; cellulose ether Culminal MHPC-500 PF (CE), Ashland; anti-foaming agent Agitan P 801 (ES), Munzing Chemie GmbH; and redispersible polymer powder (RPP) ELOTEX FL 2280, Akzo Nobel Chemicals AG.

Filling agent (F) refers to inert materials which are not involved in the hydraulic reactions. Quartz sand F34 (F1), Quarzwerke GmbH, and ground limestone 40GU (F2), Omya GmbH, were used in the examples.

In Table 13, specified percent values relate to the percentage part of a component in the total weight of the mixture.

All construction-chemical mixtures were mixed with a constant water/solid value (w/s value) of 0.21.

The slump was tested in such a way that 2000 g of the dry recipe mixture was weighed exactly and mixed in a mortar mixer in accordance with EN 196 with 420 g demineralized water for 30 seconds at stage I and then 90 seconds at stage II. The mixing water was placed in the mixing trough and then the dry mixture was added. The resulting pourable mixture was then distributed to 3 discharge rings, i.e. annular aluminum vessels which are 35 mm high and have an inner diameter of 68 mm, that were arranged so as to be centered on 3 dry spreading plates made of plexiglass, provided with concentric graduations and oriented exactly horizontally. 5 minutes after the start of mixing, the first ring was raised, and the diameter of the circular mass was determined using the caliper as the average value from two measurements which are perpendicular to one another, as the a5 value. In the same way, the two other rings were moved after 15 and 30 minutes and the values a15 and a30 were determined.

In order to determine the compressive strength after 4, 6 and 24 h, the construction-chemical mixtures were manufactured in the same way and, after the end of mixing, the pourable materials were poured into prism molds in accordance with EN 196 without additional compaction measures. The molds were stored in accordance with EN 196 and the prisms were tested in accordance with the standards on the scheduled dates.

TABLE 13

Self-levelling fillers with different calcium sulfoaluminate cements

| Cement | "Alipre" | "Next Base" | BC7-1 | BC7-2 |
|---|---|---|---|---|
| Recipe | | | | |
| CSA (%) | 19.66 | 19.66 | 19.66 | 14.74 |
| OPC (%) | 4.91 | 4.91 | 4.91 | 4.91 |
| C$ (%) | 4.91 | 4.91 | 4.91 | 4.91 |
| Total binder | 29.49 | 29.49 | 29.49 | 24.57 |
| Additive I | | | | |
| WS (%) | 0.13 | 0.13 | 0.13 | 0.13 |
| LiC (%) | 0.29 | 0.29 | 0.29 | 0.29 |
| Additive II | | | | |
| VF (%) | 0.10 | 0.10 | 0.10 | 0.10 |
| CE (%) | 0.07 | 0.07 | 0.07 | 0.07 |
| ES (%) | 0.14 | 0.14 | 0.14 | 0.14 |
| RPP (%) | 0.98 | 0.98 | 0.98 | 0.98 |
| Filling agent | | | | |
| F1 (%) | 40.54 | 40.54 | 40.54 | 40.54 |
| F2 (%) | 28.26 | 28.26 | 28.26 | 33.17 |
| W/S value | 0.21 | 0.21 | 0.21 | 0.21 |
| Slump | | | | |
| a5 (mm) | 245 | 232 | 245 | 242 |
| a15 (mm) | 246 | 232 | 240 | 245 |
| a30 (mm) | 250 | 236 | 235 | 245 |
| Compressive strength | | | | |
| 4 h (MPa) | 15.3 | 13.9 | 17.8 | 14.3 |
| 6 h (MPa) | 17.5 | 15.3 | 22.2 | 17.1 |
| 24 h (MPa) | 26.3 | 21.2 | 33.9 | 27.1 |

It is clear from Table 13 that all self-levelling fillers have a very good progression over 30 min. The filler BC7-1 having 19.66% calcium sulfoaluminate cement BC7 according to the invention shows clearly higher compressive strength after 4 h, 6 h and 24 h in comparison with the fillers having 19.66% "Alipre" and 19.66% "Next Base." The fillers BC7-2 having only 14.74% calcium sulfoaluminate cement BC7 according to the invention is surprisingly on the level of strength of the comparative recipes "Alipre" and "Next Base" having 19.66% cement content.

The calcium sulfoaluminate cement can contain in particular at most 97 wt. % $C_4A_3\$$, at least 1 wt. % belite, calculated as $C_2S$, and at least 0.5 wt. % krotite, calculated as CA.

The calcium sulfoaluminate cement can contain in particular at most 97 wt. % $C_4A_3\$$, at least 1 wt. % belite, calculated as $C_2S$, and at least 0.5 wt. % krotite, calculated as CA, and at least 0.1 wt. %, at most 2.0 wt. %, in particular at most 1.0 wt. %, in particular at most 0.5 wt. %, mayenite, calculated as C12A7.

The calcium sulfoaluminate cement can contain in particular at most 97 wt. % $C_4A_3\$$, at least 1.5 wt. % belite, calculated as $C_2S$, and at least 0.5 wt. % krotite, calculated as CA.

The calcium sulfoaluminate cement can contain in particular at most 97 wt. % $C_4A_3\$$, at least 1.5 wt. % belite, calculated as $C_2S$, and at least 0.5 wt. % krotite, calculated as CA, and at least 0.1 wt. %, at most 2.0 wt. %, in particular at most 1.0 wt. %, in particular at most 0.5 wt. %, mayenite, calculated as C12A7.

The invention claimed is:

1. Method for manufacturing a calcium sulfoaluminate cement having at least 90% by weight C4A3$ in crystalline or amorphous form or as a mixture of crystalline and amorphous parts and a specific grinding fineness according to Blaine between 3500 cm2/g and 6250 cm2/g, wherein for manufacturing the calcium sulfoaluminate cement a mixture of raw materials is used, which contains between 41 and 50% by weight $Al_2O_3$,
between 34 and 41% by weight CaO and
between 11 and 19% by weight $SO_3$,
as well as
between 0.1 and 3% by weight $SiO_2$ and/or
between 0.1 and 1% by weight $Fe_2O_3$ and/or
between 0.05 and 2.5% by weight $TiO_2$ and/or
between 0.05 and 2.5% by weight ZnO,
the method comprising the steps:
pulverizing the raw materials to a mixture with a specific grinding fineness according to Blaine between 3500 cm²/g and 6000 cm²/g and
calcining the mixture at a calcining temperature of at least 1150° C.

2. Method as claimed in claim 1, characterized in that the pulverizing is performed in a ball mill preferably in two steps, wherein in both steps different grinding bodies are used in the ball mill.

3. Calcium sulfoaluminate cement, characterized in that it contains at least 90% by weight C4A3$ in crystalline or amorphous form or as a mixture of crystalline and amorphous parts as well as at most 0.5% by weight free lime, calculated as CaO, and/or
at most 0.5% by weight $C_3A$ and/or
at most 2.0% by weight Mayenit, calculated as $C_{12}A_7$, and/or
at most 10.0% by weight Krotit, calculated as CA, and further
between 0.5 and 10.0% by weight $C_4AF$ and its mixed crystals $C_6A_{3-x}F_x$ with $1 \le x \le 3$ and/or between 0.5% by weight and 10.0% by weight Belit, calculated as $C_2S$, and/or
at least 0.5% by weight Krotit, calculated as CA,
and further has a specific grinding fineness according to Blaine between 3500 cm²/g and 6000 cm²/g.

4. Calcium sulfoaluminate cement as claimed in claim 3, characterized in that it contains one or more of the following further elements or their oxides with different oxidation numbers as well as their compounds: Si, Na, K, Mg, Sr, Ba, Ti, Zr, V, P, Cr, Mn, Zn and/or other transition metals.

* * * * *